No. 671,949. Patented Apr. 16, 1901.
H. & B. B. BIENHOFF.
VEHICLE.
(Application filed Jan. 12, 1900. Renewed Sept. 21, 1900.)
(No Model.)
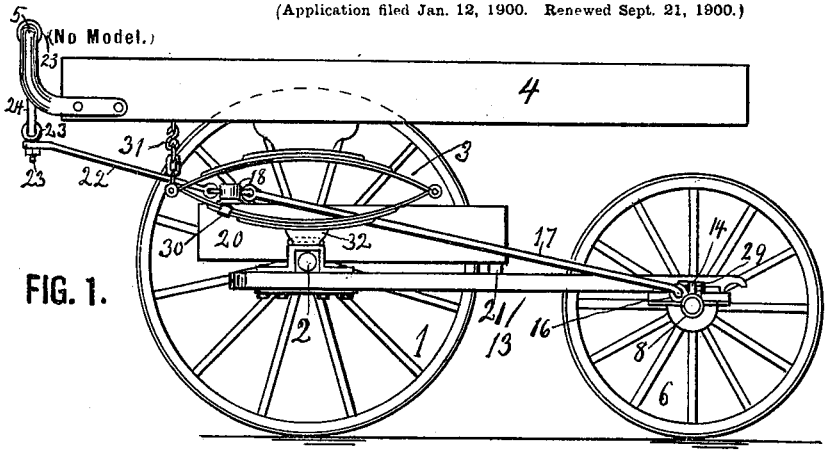
FIG. 1.
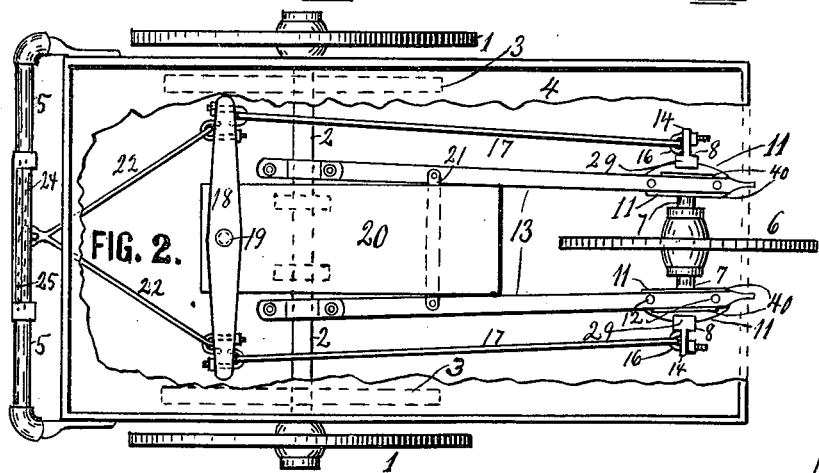
FIG. 2.
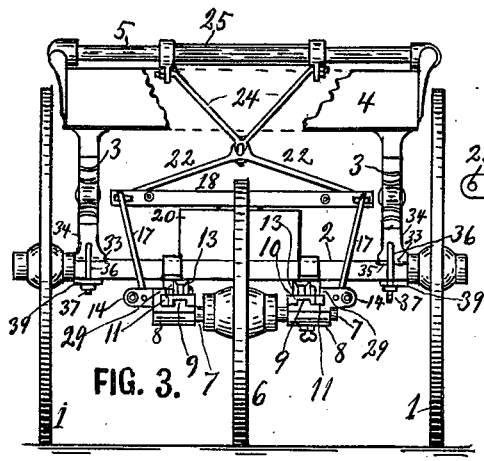
FIG. 3.
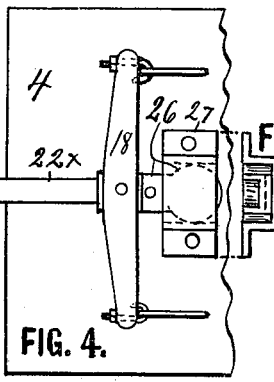
FIG. 4.
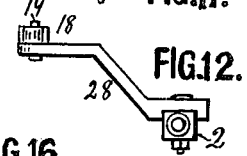
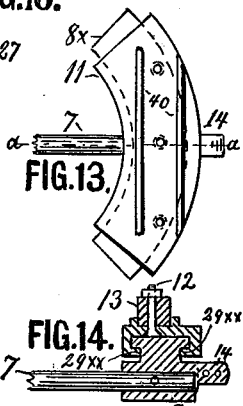
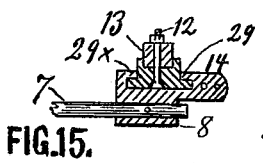
WITNESSES:
E. C. Carlsen.
D. E. Carlsen.
INVENTORS:
Henry Bienhoff,
Benjamin B. Bienhoff.
BY their ATTORNEY: A. M. Carlsen.
THE NORRIS PETERS CO., PHOTO-LITHO., WASHINGTON, D. C.

UNITED STATES PATENT OFFICE.

HENRY BIENHOFF AND BENJAMIN B. BIENHOFF, OF ST. PAUL, MINNESOTA.

VEHICLE.

SPECIFICATION forming part of Letters Patent No. 671,949, dated April 16, 1901.

Application filed January 12, 1900. Renewed September 21, 1900. Serial No. 30,729. (No model.)

*To all whom it may concern:*

Be it known that we, HENRY BIENHOFF and BENJAMIN B. BIENHOFF, citizens of the United States, residing at St. Paul, in the county of Ramsey and State of Minnesota, have invented certain new and useful Improvements in Vehicles; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in vehicles of the class designed to be pushed by a person walking behind it, like baby-carriages, trucks, and carts used for moving baggage and freight, peddling fruit in cities, &c.

The main object of the invention is to provide a hand-cart with means whereby the operator walking behind it may easily turn and hold the front wheel or wheels in any desired direction, and thereby control the course of the vehicle without tilting up its forward end. This and other objects we attain by the novel construction and arrangement of parts illustrated in the accompanying drawings, in which—

Figure 1 is a side elevation of a hand-cart containing our improvements with one of the side wheels removed from the main axle. Fig. 2 is a top or plan view of Fig. 1 with all wheels shown, but a portion of the bottom of the main box cut away. Fig. 3 is a front end elevation of the cart with the frame-bar 21 in Figs. 1 and 2 omitted and a portion of the box cut away to expose more clearly the steering mechanism. Fig. 4 is a bottom view of the rear portion of the box of the cart, showing a modification of the steering mechanism. Fig. 5 is a detail view of the band or clip 30 in Fig. 1. Fig. 6 is a top view, Fig. 7 a side view, and Fig. 8 is a front or edge view, of the spring-supporting block we use on the main axle. Fig. 9 is a bottom view of the plate 11, secured one to the front end of each hound 13. Fig. 10 is a top view of one of the hangers or blocks in which the ends of the front axle are secured. Fig. 11 is a bottom view or lower edge view of Fig. 10. Fig. 12 shows a modified manner of mounting the beam 18 on the main axle 2 by means of a bracket 28 instead of the box 20 in Figs. 1, 2, and 3. Fig. 13 is a top view of a modification of the parts, Figs. 9 and 10. Fig. 14 is a sectional view on the line $a\,a$ in Fig. 13. Fig. 15 is a modification of Fig. 14. Fig. 16 is a left-hand view of the guide 27 in Fig. 4 with the arm $22^\times$ and its head 26 in the guide, but the beam 18 is omitted.

Referring to the various parts in the drawings by reference-numerals, the push-cart or hand-cart illustrated is made up of the two side ground-wheels 1 1, their axle 2, springs 3, mounted on the axle, or blocks secured on the axle, and the body or box 4, mounted on said springs and provided at its rear end with the push-handle 5.

6 is a third ground-wheel, placed centrally forward of the main wheels and serves to support and guide or steer the front end of the truck or cart. This wheel 6 is journaled on the axle 7, which has its ends secured in the blocks 8, and the latter slide with the upwardly-turned segmental ribs 9 in the segmental grooves 10 of the plates 11, secured by the countersunk-headed bolts 12 to the hounds 13, the rear ends of which are secured to the main axle 2.

To the ears or lugs 14 of the sliding blocks 8 are pivotally and adjustably secured by the staples 16 the forward ends of the rods 17, which have their rearward ends similarly secured to the ends of a horizontally-swinging centrally-pivoted beam 18, which in Fig. 2 is shown pivoted upon the special box 20, secured upon the main axle and on the cross-bar 21, bolted upon the hounds. To the rear side of the ends of the beam 18 are pivotally and adjustably secured the rods 22, which are united at their rear ends and provided with a swivel-eye 23, which is connected by the back-and-forward swinging V-shaped support 24 to the sleeve 25, sliding on the push-handle 5. Said sleeve is partly cut away or open at one side, so that the operator's hand grasping the handle and sleeve may squeeze the two together, and thus prevent the sleeve from moving accidentally.

In operation when the cart is pushed by the handle 5 and it is desired to change its direction the operator simply slides the sleeve 25 in the direction he wishes the rear end of the cart to swing and the front wheel will thereby change its direction to the opposite side, and thus steer the cart in the desired direction.

In the modification, Figs. 4 and 16, is shown how instead of the rods 22 and box 20 the eyebolt or stud 23 may be secured at $23^\times$ in the rear end of the single arm $22^\times$, and the latter has the beam 18 rigidly secured transversely upon it and its forward end secured in a headpiece 26, sliding back and forth in the guiding-bracket 27, secured up under the bottom of the main box 4 to allow for the vertical vibration of the box when it is mounted on springs. The arm also swings in the bracket, so as to follow with its rear end the motion of the V-piece 24 and the sleeve, or where the handle-bar is made like a rearwardly-curved segment, as is the case on many baby-carriages, the head 26 may be placed in the center of the segment and the arm $22^\times$ pivoted directly to the sleeve 25, dispensing with the V-piece, and if the cart has no springs then the sliding of the head 26 may also be dispensed with and a pivot-joint used only.

Where the box 20 is not needed for carrying tools or special goods in, it may be dispensed with and the bracket 28 in Fig. 12 substituted for supporting the beam 18, or if the cart has no springs the beam may be pivoted to the bottom of the main box.

In Figs. 1, 2, 3, 10, and 11 it will be understood that the hooks 29 of the blocks 8 by projecting up and inwardly over the outer segmental edges of the plates 11 keep said blocks in their segmentally-grooved connection with the plates and prevent the blocks from separating downward from the plates. In the modification, Fig. 15, is added a similar hook $29^\times$, taking over the inner edge of the plate, which may also be segmental, while in Figs. 13 and 14 is shown how the lips $29^{\times\times}$ may be on the upper plate, extend all along it, and fit into segmental grooves in the blocks $8^\times$.

When it becomes necessary to partly or entirely lift the rear end of the cart by its handle, as in pushing over a high curbstone from the street onto the sidewalk, the chain 31, secured to the rear end of the spring 3, (see Fig. 1,) being permanently hooked up under the box 4 prevents an undue strain on the springs by the weight of the wheels and axle. For a similar purpose the parts of the spring are held from spreading by the clip 30, which is permanently secured to one of the parts of the spring. It will be understood, however, that we do not mean to confine our invention only to carts having springs, as it is equally adapted for carts and other vehicles having no springs.

The spring-supporting block 34 (best shown in the detail views, Figs. 6, 7, and 8) is a hollow casting, as indicated in dotted lines, with lips 32, adapted to be secured to the spring, and with the lips 35 straddling the axle, and the lips 33 for steadying it on the axle. The lips 35 are bifurcated to admit the parallel arms 36 of the clip 37, passed over the base-bar 38 of the block and secured by nuts under a strap or plate 39, placed underneath the axle.

40 represents ribs on the plates 11 to help hold them rigid on the hounds, and it will be understood that said plates amount to a fifth-wheel with its longitudinal central portion cut away, and on the remaining portions of the fifth-wheel the blocks at the ends of the axle 7 are guided to move or swing on the geometrical center of the fifth-wheel.

While we have shown only one front wheel, it is obvious that two may be used whenever so desired, either in between or outside the hounds and the plates 11.

Having thus described our invention, what we claim, and desire to secure by Letters Patent, is—

1. A wheeled vehicle having a horizontal, transversely-disposed push-bar or push-handle at its rear end, a sleeve or similar piece sliding on said bar and operatively connected with the axle of the front wheel or wheels, to swing the same horizontally by sliding the sleeve on the handle.

2. A wheeled vehicle having a horizontal, transversely-disposed push bar or handle at its rear end, a sleeve sliding on said handle and operatively connected with a horizontally-swinging steering wheel, or wheels, at the front end of the cart, so that by moving the sleeve on the handle the front wheel will turn to either side, said sleeve being partly cut away or open at one side.

3. In a wheeled vehicle adapted to be pushed by a person walking behind it, the combination with the rear axle, of a pair of hounds extending forwardly therefrom, two segmental plates secured separately one to each hound near their forward ends, two blocks slidingly connected with the plates, and thereby guided to slide segmentally, a shaft or axle firmly secured with its ends in said blocks and a steering ground-wheel journaled on said axle, and a suitable operating mechanism pivotally secured to and extending from said blocks to within convenient reach of the person pushing the cart.

4. A push-cart or similar vehicle, having in combination a front fifth-wheel provided with a large, longitudinal central gap entirely through it, to form space for a steering-wheel, a steering-wheel journaled on an axle having its ends secured in blocks slidingly connected with the remaining portions of the fifth-wheel; a horizontally-disposed push handle or bar at the rear end of the cart, an operating-piece sliding on said handle, a horizontally-swinging beam, or two-armed lever, pivotally secured to some stationary part of the cart, rods connecting the ends of said beam with the sliding blocks, and suitable connection between the beam and the sliding piece on the handle-bar, so that the beam and the front axle will swing horizontally when the operating-piece is slid longitudinally on the handle.

5. A push-cart having an upper and a lower box for carrying things in, and a steering mechanism extending from the front wheel to the push-handle at the rear end of the cart, such mechanism involving a horizontally-swinging lever or beam pivotally mounted on the top of the lower box.

In testimony whereof we affix our signatures in presence of two witnesses.

HENRY BIENHOFF.
BENJAMIN B. BIENHOFF.

Witnesses:
CHAS. H. GLUECK,
LOUIS GLUECK.